US007750291B2

(12) United States Patent
Shiea

(10) Patent No.: US 7,750,291 B2
(45) Date of Patent: Jul. 6, 2010

(54) MASS SPECTROMETRIC METHOD AND MASS SPECTROMETER FOR ANALYZING A VAPORIZED SAMPLE

(75) Inventor: Jentaie Shiea, Kaohsiung (TW)

(73) Assignee: National Sun Yat-Sen University, Kaohsiung (TW)

( * ) Notice: Subject to any disclaimer, the term of this patent is extended or adjusted under 35 U.S.C. 154(b) by 324 days.

(21) Appl. No.: 12/036,747

(22) Filed: Feb. 25, 2008

(65) Prior Publication Data

US 2009/0212206 A1 Aug. 27, 2009

(51) Int. Cl.
*H01J 49/00* (2006.01)
*B01D 59/44* (2006.01)

(52) U.S. Cl. ....................... 250/288; 250/281; 250/282; 250/284

(58) Field of Classification Search ....................... None
See application file for complete search history.

(56) References Cited

U.S. PATENT DOCUMENTS

| | | | | |
|---|---|---|---|---|
| 5,294,797 | A * | 3/1994 | Frey et al. | 250/427 |
| 5,663,561 | A * | 9/1997 | Franzen et al. | 250/288 |
| 5,965,884 | A * | 10/1999 | Laiko et al. | 250/288 |
| 7,193,223 | B2 | 3/2007 | Franzen | |
| 7,335,897 | B2 * | 2/2008 | Takats et al. | 250/425 |
| 7,339,166 | B2 * | 3/2008 | Tang et al. | 250/288 |
| 7,394,065 | B2 * | 7/2008 | Grimm et al. | 250/288 |
| 7,525,086 | B2 * | 4/2009 | Suzuki | 250/288 |
| 2003/0071209 | A1 * | 4/2003 | Park et al. | 250/288 |
| 2003/0111600 | A1 * | 6/2003 | Thomson et al. | 250/288 |
| 2004/0007673 | A1 * | 1/2004 | Coon et al. | 250/424 |
| 2009/0294650 | A1 * | 12/2009 | Schneider et al. | 250/282 |
| 2010/0012830 | A1 * | 1/2010 | Cristoni | 250/282 |

* cited by examiner

*Primary Examiner*—David A Vanore
(74) *Attorney, Agent, or Firm*—Stephen A. Bent; Foley & Lardner LLP

(57) ABSTRACT

A mass spectrometric method for analyzing a vaporized sample, comprising the steps of: forcing sequentially generated charge-laden liquid drops to move towards a receiving unit of a mass spectrometer along a traveling path; establishing a concentration gradient for a target analyte so as to permit diffusion of the vaporized sample which contains at least one of the target analyte therein along a plurality of diffusing paths; and introducing the target-analyte containing vaporized sample through an inlet such that at least one of said diffusing paths intersects said traveling path so as to enable said at least one target analyte to be occluded in at least one of said charge-laden liquid drops to thereby form at least one corresponding ionized analyte for analysis by the mass spectrometer.

10 Claims, 5 Drawing Sheets

MASS SPECTROMETRIC METHOD AND MASS SPECTROMETER FOR ANALYZING A VAPORIZED SAMPLE

BACKGROUND OF THE INVENTION

1. Field of the Invention

The invention relates to a mass spectrometric method and a mass spectrometer, more particularly to a mass spectrometric method and a mass spectrometer for analyzing a vaporized sample.

2. Description of the Related Art

Conventionally, acid-base titration and indophenol colorimetry (NIEA W448.51B) are used for analyzing the quantity of ammonia ($NH_4^+$) contained in aqueous solutions. However, since indophenol colorimetry involves the use of chemicals such as hypochlorite, phenol and sodium nitroprusside, it is not environmental-friendly method. In addition, since complicated and time-consuming procedures are involved, both acid-base titration and indophenol colorimetry are not suitable for analyzing a large number samples.

Although mass spectrometry has the advantages of being convenient to operate and being capable of obtaining analysis results quickly, there has yet to be a mass spectrometric method that can be implemented directly on samples in the vaporized or liquid states for analysis.

SUMMARY OF THE INVENTION

Therefore, the object of the present invention is to provide a mass spectrometric method and a mass spectrometer that are capable of analyzing a vaporized sample.

According to one aspect of the present invention, there is provided a mass spectrometric method for analyzing a vaporized sample. The mass spectrometric method includes the steps of: forcing sequentially generated charge-laden liquid drops to move towards a receiving unit of a mass spectrometer along a traveling path; establishing a concentration gradient for a target analyte so as to permit diffusion of the vaporized sample which contains at least one of the target analyte therein along a plurality of diffusing paths; and introducing the target-analyte containing vaporized sample through an inlet such that at least one of said diffusing paths intersects said traveling path so as to enable said at least one target analyte to be occluded in at least one of said charge-laden liquid drops to thereby form at least one corresponding ionized analyte for analysis by the mass spectrometer.

According to another aspect of the present invention, there is provided a mass spectrometer for analyzing a vaporized sample. The mass spectrometer includes a chamber, a receiving unit, an electrospray unit, a voltage supplying member, and a sample supply unit. The receiving unit is disposed in spatial communication with the chamber to admit therein ionized analytes that are derived from a vaporized sample, and includes a mass analyzer for analyzing the ionized analytes. The electrospray unit includes a nozzle that is disposed in spatial communication with the chamber, that is configured to sequentially form liquid drops of an electrospray medium in the chamber, and that is spaced apart from the receiving unit in a longitudinal direction so as to define a traveling path. The voltage supplying member is disposed to establish between the nozzle and the receiving unit a potential difference which is of an intensity such that the liquid drops are forced to leave the nozzle as charge-laden ones for heading toward the receiving unit along the traveling path. The sample supply unit has an inlet that is disposed in spatial communication with the chamber for introducing the vaporized sample such that, by virtue of concentration gradient for at least one target analyte contained in the vaporized sample, a plurality of diffusing paths are generated in the chamber. At least one of the plurality of diffusing paths intersects the traveling path so as to enable the at least one target analyte to be occluded in at least one of the charge-laden liquid drops to thereby form a corresponding one of the ionized analytes.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
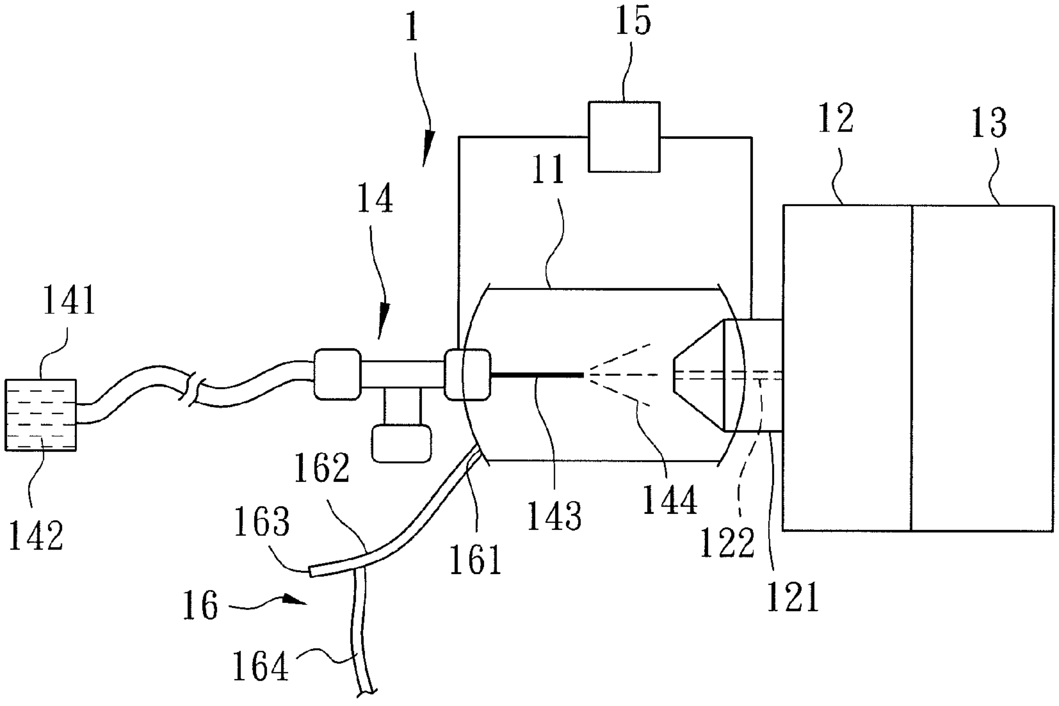
FIG. 1 is a schematic view of the first preferred embodiment of a mass spectrometer according to the present invention.

Before the present invention is described in greater detail, it should be noted herein that like elements are denoted by the same reference numerals throughout the disclosure. It is also noted herein that in the accompanying drawings, sizes of constituting elements and relative distances among the elements are not drawn to scale.

In the following preferred embodiments, a mass analyzer used is a liquid chromatography triple quadrupole mass analyzer with model number Quattro LC and manufactured by Micromass (Waters).

As shown in FIG. 1, the first preferred embodiment of a mass spectrometer 1 for analyzing a vaporized sample according to the present invention includes a chamber 11, a receiving unit 12, a detector 13, an electrospray unit 14, a voltage supplying member 15, and a sample supply unit 16.

The receiving unit 12 is disposed in spatial communication with the chamber 11 to admit therein ionized analytes that are derived from the vaporized sample, and includes a mass analyzer 121 for analyzing the ionized analytes. The mass analyzer 121 is formed with a conduit 122 that is in spatial communication with the chamber 11.

The detector 13 is disposed to receive signals generated by the mass analyzer 121 as a result of analyzing the ionized analytes so as to generate a mass spectrometric analysis result, i.e., a mass spectrum.

The electrospray unit 14 includes a reservoir 141 for accommodating a liquid electrospray medium 142, and a nozzle 143 disposed downstream of the reservoir 141. The nozzle 143 is further disposed in spatial communication with the chamber 11, is configured to sequentially form liquid drops 144 of the electrospray medium 142 in the chamber 11, and is spaced apart from the conduit 122 of the mass analyzer 121 of the receiving unit 12 in a longitudinal direction so as to define a traveling path.

The voltage supplying member 15 is disposed to establish between the nozzle 143 of the electrospray unit 14 and the mass analyzer 121 of the receiving unit 12 a potential difference which is of an intensity such that the liquid drops 144 are forced to leave the nozzle 143 as charge-laden ones for heading toward the conduit 122 of the mass analyzer 121 along the traveling path.

The sample supply unit 16 has an inlet 161 that is disposed in spatial communication with the chamber 11 for introducing the vaporized sample such that, by virtue of concentration gradient for at least one target analyte contained in the vaporized sample, a plurality of diffusing paths are generated in the chamber 11.

At least one of the plurality of diffusing paths intersects the traveling path so as to enable the at least one target analyte to be occluded in at least one of the charge-laden liquid drops 144 to thereby form a corresponding one of the ionized analytes.

In this embodiment, the sample supply unit 16 includes a sample supplying tube 162 that is formed with the inlet 161 at one end and that is further formed with an opening 163 at the other end for introducing the vaporized sample from the opening 163, through the sample supplying tube 162, out of the inlet 161 and into the chamber 11.

A gas supplying tube 164 may be optionally connected directly to the sample supplying tube 162 and upstream of the inlet 161 for providing an inert gas (e.g., nitrogen gas) to force the target-analyte containing vaporized sample through the inlet 161 into the chamber 11.

It should be noted herein that the configuration of the sample supply unit 16 according to the first preferred embodiment is suitable for use when the vaporized sample comes directly from a human's exhalation.

Figure 2:
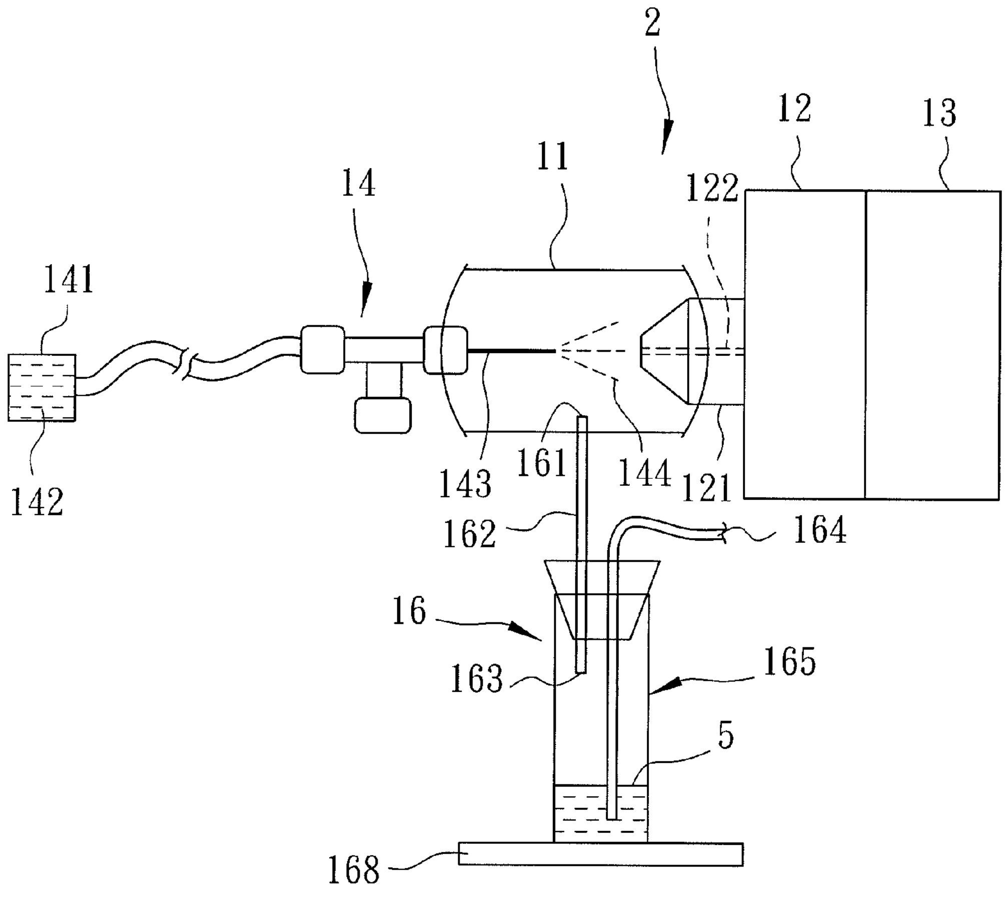
FIG. 2 is a schematic view of the second preferred embodiment of a mass spectrometer according to the present invention.

As shown in FIG. 2, the second preferred embodiment of a mass spectrometer 2 according to the present invention differs from the first preferred embodiment in that the sample supply unit 16' of the second preferred embodiment further includes a container 165 for accommodating the target-analyte containing sample in liquid and vaporized states, where the liquid is denoted by reference numeral "5". The sample supplying tube 162 is disposed downstream of the container 165. The gas supplying tube 164 is disposed upstream of the container 165, and is submerged in the liquid 5 to permit an inert gas introduced therethrough to purge the liquid 5, thereby forcing the target-analyte containing vaporized sample through the inlet 161 into the chamber 11. In this embodiment, the gas supplying tube 164 is not connected directly to the sample supplying tube 162.

A heating member 168 may be optionally provided beneath the container 165 to heat the liquid 5. Heating of the liquid 5 accelerates vaporization of the liquid 5 into the analyte-containing vaporized sample, which in turn accelerates the diffusion of the analyte-containing vaporized sample into the chamber 11.

Operation of the mass spectrometer 1 according to the first preferred embodiment will now be described with reference to FIG. 1.

First, sequentially generated charge-laden liquid drops 144 are forced to move towards the receiving unit 12 of the mass spectrometer 1 along a traveling path. In this embodiment, the sequentially generated charge-laden liquid drops 144 are formed by the electrospray unit 14 at the nozzle 143 thereof, and are forced to move towards the mass analyzer 121 of the receiving unit 12 by the electrospray unit 14 in the chamber 11.

Second, a concentration gradient for a target analyte is established so as to permit diffusion of the vaporized sample which contains at least one of the target analyte therein along a plurality of diffusing paths. Preferably, the target-analyte containing vaporized sample diffuses along the diffusing paths in the chamber 11.

Third, the target-analyte containing vaporized sample is introduced through the inlet 161 of the sample supplying tube 162 of the sample supply unit 16 such that at least one of the diffusing paths intersects the traveling path so as to enable the at least one target analyte to be occluded in at least one of the charge-laden liquid drops 144 to thereby form at least one corresponding ionized analyte for analysis by the mass spectrometer 1. Preferably, the ionized analytes are analyzed by the mass analyzer 121 of the receiving unit 12 after entering the mass analyzer 121 through the conduit 122. Subsequently, the signals generated by the mass analyzer 121 as a result of analyzing the ionized analytes are received by the detector 13 for generating a mass spectrum.

Optionally, an inert gas is provided to force the target-analyte containing vaporized sample through the inlet 161. In this embodiment, the inert gas is provided through the gas supplying tube 164 of the sample supply unit 16'.

Operation of the mass spectrometer 2 according to the second preferred embodiment will now be described with reference to FIG. 2. The operation of the second preferred embodiment differs from that of the first preferred embodiment in that the operation of the second preferred embodiment further includes vaporizing the target-analyte containing sample from a liquid 5 by gas purging prior to the target-analyte containing vaporized sample is introduced through the inlet 161 into the chamber 11. In particular, gas purging is performed by providing an inert gas into the liquid 5 through the gas supplying tube 164, which is submerged in the liquid 5. In other words, the inert gas serves as the purging gas, an example of which is nitrogen.

Alternatively, the target-analyte containing sample is vaporized from the liquid 5 by heating the liquid 5. In particular, heating of the liquid 5 is performed by the heating member 168 of the sample supply unit 16'. It should be noted herein that gas purging and heating of the liquid 5 can be performed simultaneously.

It should be further noted herein that the mass spectrometer 2 according to the second preferred embodiment is suitable for use in analyzing ammonia aqueous solutions, urine, perspiration, saliva, and aqueous solutions that have exhalation of an organism dissolved therein.

When the target analyte is ammonia, the presence of ammonia-related signals generated by the mass analyzer 121 as a result of analyzing the ionized analytes indicates that the sample contains ammonia. The ammonia-related signals are those formed by corresponding ionized analytes. In the following exemplary examples, since the samples contain water or water vapor, instances of the corresponding ionized analytes include $(NH_3)H^+$, $(NH_3)_2H^+$, $(NH_3.H_2O)H^+$, etc. It is important to note that in the case where the target analyte is ammonia, the electrospray medium 142 may not contain ammonia. In addition, since the ionized analytes are in the form similar to ammonium ions, $NH_4^+$, the electrospray unit 14 has to be in a "positive ion mode", and the electrospray medium 142 preferably contains protons ($H^+$).

Since ammonia ($NH_3$) and water react reversibly to form ammonium ion ($NH_4^{30}$) and hydroxyl ion ($OH^-$) in an ammonia-containing aqueous solution, if the target analyte in the sample is ammonia, basification can be performed on the sample by adding the hydroxyl ions ($OH^-$) therein for increasing the analysis efficiency.

When it is desired to analyze an human's exhalation for ammonia (i.e., the target analyte is ammonia), two routes can be approached, one of which is by performing mass spectrometric analysis directly on the exhalation, and the other one of which is by dissolving the exhalation in an acidic solution that is highly soluble for ammonia. An example of the acidic solution that is highly soluble for ammonia is an acetic acid aqueous solution.

It should be further noted herein that the sample can be obtained indirectly in some cases, an example of which is provided hereinbelow. When it is desired to detect a gaseous-state target analyte in a solid material (e.g., solid absorbent) that is adsorbed with the gaseous-state matters, a release process (e.g., a heating process) can be conducted on the solid material for obtaining the sample. By conducting the mass spectrometric method of the present invention on the obtained sample, it can be inferred whether the substance contains the target analyte.

Referring to FIG. 1, since the "positive ion mode" involving charged liquid drops 144 that contain protons ($H^+$) is preferably used for the electrospray unit 14, the electrospray medium 142 is preferably a solution containing an acid and a volatile liquid. More preferably, the acid is an organic acid selected from the group consisting of formic acid, acetic acid, trifluroacetic acid, and a combination thereof, and the volatile liquid is alcohol, such as methanol. In the embodiments of the present invention, the electrospray medium 142 is a methanol solution containing 0.1 vol % acetic acid.

The "positive ion mode" is achieved by establishing the potential difference between the nozzle 143 of the electrospray unit 14 and the mass analyzer 121 of the receiving unit 12 with the electric field in an orientation that runs from the nozzle 143 to the mass analyzer 121. Preferably, the potential difference is above 3.6 kV. In the following exemplary examples, the potential difference is 3.9 kV.

Chemicals Used

Exemplary examples and comparative examples were conducted using the following chemicals:

1. methanol: model no. UN1230 manufactured by Merck KGaA of Germany (also known as German Merck)
2. acetic acid: model no. UN2789 manufactured by Mallinckrodt Chemical Ltd.
3. sodium hydroxide: manufactured by Osaka Organic Chemical Ind. Ltd. of Japan
4. urea: manufactured by Pei Li Pharmaceutical Ind. Co. Ltd. Of Taiwan In the exemplary examples presented hereinbelow, the target analyte is ammonia. In addition, if not specified otherwise, the exemplary examples were conducted under room temperature and atmospheric pressure. Moreover, the voltage level at the nozzle 143 of the electrospray unit 14 is 3.9 kV higher than that at the mass analyzer 121 of the receiving unit 12. Further, the flow rate of the electrospray medium 142 is 150 μL per hour, the volume of liquid-state samples 5 are 1 mL, and the flow rate of the nitrogen gas is 80 L per hour.

Furthermore, since the electrospray medium 142 is an acetic solution that contains 0.1 vol % acetic acid, and the electrospray procedure of the exemplary examples was conducted under the "positive ion mode", a $(MeOH)H^+$ (with a mass-to-charge ratio (m/z) value of 33) background signal is present in the mass spectra obtained in the exemplary examples, and is denoted by "▲". When ammonia ($NH_3$) is detected, ammonia-related signals formed by corresponding ionized analytes will appear in the mass spectra. For instance, a signal with m/z value of 18 is formed by $(NH_3)H^+$, and is denoted by "■", and a signal with m/z value of 36 is formed by $(NH_3.H_2O)H^+$, and is denoted by "●", etc.

EXEMPLARY EXAMPLES 1 TO 6

Mass Spectrometric Analysis Conducted on Human Urine Samples Using the Mass Spectrometer of the Second Preferred Embodiment When human urine is exposed to air, urea contained therein gets hydrolyzed and forms ammonia.

In exemplary examples 1 to 6, a testee's urine sample and various diluted urine samples were used as the liquid sample (volume of 600 μL), and the mass spectrometric analysis was conducted using the second preferred embodiment of the present invention, where an inert gas was supplied to purge the liquid sample. The results obtained for the exemplary examples 1 to 6 are tabulated in Table 1 below.

TABLE 1

| | Exemplary Example 1 | Exemplary Example 2 | Exemplary Example 3 | Exemplary Example 4 | Exemplary Example 5 | Exemplary Example 6 |
|---|---|---|---|---|---|---|
| Sample Type | | | Human urine | | | |
| Dilution Ratio | Undiluted | 10× | 100× | 1000× | 10000× | 100000× |
| Mass Spectrum | FIG. 3(a) | FIG. 3(b) | FIG. 3(c) | FIG. 3(d) | FIG. 3(e) | FIG. 3(f) |

Figure 3:
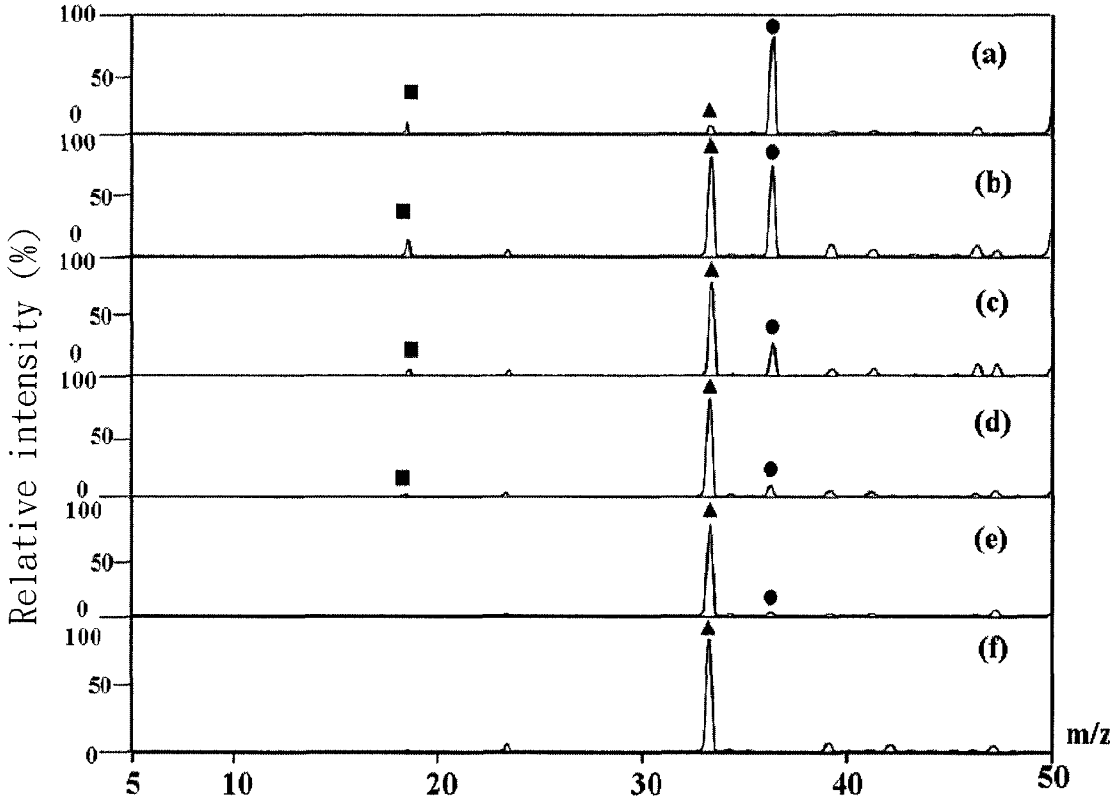
FIG. 3 is a diagram, illustrating mass spectra obtained as experiment results of exemplary examples 1 to 6.

As shown in FIGS. 3(*a*)~3(*d*), ion peaks respectively corresponding to the ammonia-related signals denoted by "■" (formed by $(NH_3)H^+$) and "●" (formed by $(NH_3.H_2O)H^+$), as well as to the background signal denoted by "▲" are observed. In FIG. 3(*a*), relative intensity of the background signal "▲" is low, and those of the ammonia-related signals, especially of the "●" signal, are much higher, indicating that ammonia is a major analyte detected for the undiluted urine sample. In other words, it is demonstrated by exemplary example 1 that there is a high quantity of ammonia in the undiluted urine sample.

As shown in FIG. 3(*d*), even when the urine sample was diluted up to 1,000 times, by virtue of a significant ion peak, the "■" signal is still detectable. Observation can be found for the ion peak formed by the "●" signal in each of FIGS. 3(*a*)~3(*e*). In particular, as shown in FIG. 3(*e*), even though the liquid sample for exemplary example 5 is the diluted 10,000× urine sample, the ion peak formed by the "●" signal can still be observed, indicating the presence of ammonia. However, as shown in FIG. 3(*f*), when the urine sample is diluted 100,000 times, only the background signal "▲" is detected, i.e., the presence of ammonia is not detected.

EXEMPLARY EXAMPLES 7 TO 26 VS. COMPARATIVE EXAMPLES 1 TO 6

Determination of the Possibility of Helicobacter Pylori Parasitism in Human Stomach Using the Mass Spectrometer of the First and Second Preferred Embodiments vs. Using Urea Breath Test Helicobacter pylorus uses its flagellum to attach to stomach lining, and secretes urea to neutralize gastric acid so as to parasitize in the stomach. It is known that helicobacter pylorus damages the stomach lining, and eventually causes diseases such as acute gastritis, chronic gastritis, peptic ulcer, etc. In addition, a high percentage of patients who suffer from gastric cancer have had helicobacter pylori infection. Therefore, the World Health Organization (WHO) categorizes this bacterium as carcinogenic.

Since helicobacter pylorus is believed to be intimately connected to various kinds of severe gastric diseases, the presence of helicobacter pylorus in a patient's stomach is an important factor for doctors to take into account when diagnosing gastric diseases.

At present, a common practice for determining whether the stomach has helicobacter pylori infection is performed by using a method called "urea breath test" (UBT). In UBT, an isotopic mass spectrometer is used to detect the quantity of $^{13}CO_2$in a testee's breath prior to and approximately 30 minutes after the testee has taken urea that contains $^{13}C$ (i.e.,$^{13}C$-urea). Since uremia secreted by *helicobacter pylorus hydrolyzes* $^{13}C$-urea, difference between the detected quantities of $^{13}CO_2$ prior to and after taking $^{13}C$-urea is greater for testees whose stomach is more severely infected by helicobacter pylorus. Under a common practice, when the difference is greater than 4, the testee is considered helicobacter pylori infection positive. On the other hand, when the difference is lower than 4, the testee is considered helicobacter pylori infection negative.

Although UBT is relatively convenient and quick, selling price of $^{13}C$-urea is extremely high, keeping the cost of UBT high.

In comparative examples 1 to 5, UBT was conducted on five testees by Gastrointestinal Department in Chung-Ho Memorial Hospital, Kaohsiung Medical University, and the results obtained therefrom are tabulated in Table 2 below, where $T_0$represents logarithmic value of the concentration of $^{13}CO_2$prior to taking $^{13}C$-urea, and $T_{30}$represents logarithmic value of the concentration of $^{13}CO_2$ 30 minutes after taking $^{13}C$-urea.

TABLE 2

| | Comparative Example | | | | |
|---|---|---|---|---|---|
| | 1 | 2 | 3 | 4 | 5 |
| Testee | j | k | m | n | p |
| $T_0$ | −22.39 | −24.78 | −23.13 | −22.39 | −23.00 |
| $T_{30}$ | −14.68 | −23.66 | −23.40 | −21.65 | −22.02 |
| Difference ($T_0 - T_{30}$) | 7.71 | 1.12 | −0.27 | 0.74 | 0.98 |
| *Helicobacter Pylori* Infection | Yes (Positive) | No (Negative) | No (Negative) | No (Negative) | No (Negative) |

The relatively low amount of $^{13}CO_2$obtained for testee 'm' after taking $^{13}C$-urea is generally considered as due to experimental error.

Ammonia is a product formed after urea is hydrolyzed. The mass spectrometric method of the present invention and UBT are both based on the hydrolysis of urea by uremia secreted by helicobacter pylorus. However, the two methods differ in that the target of the present invention is the ammonia produced after the urea is hydrolyzed by uremia, where $^{13}C$-urea need not be taken, while the target of UBT is $^{13}CO_2$, where $^{13}C$-urea needs to be taken. In exemplary examples 7 to 16 and exemplary examples 17 to 26, the mass spectrometric method of the present invention was used to conduct analysis on the breaths of the five testees, and the results are compared to those obtained from comparative examples 1 to 5.

In exemplary examples 7 to 16, the mass spectrometric method was conducted using the mass spectrometer 2 of the first preferred embodiment shown in FIG. 1, where the flow rate of nitrogen gas is 115 L/hr. Mass spectrometric analysis was conducted on the breath of each of the five testees by making each of the testees exhale at the opening 163 into the chamber 11 through the sample supplying tube 162 prior to and 30 minutes after the testee has taken regular urea. In the following discussion, the mass spectrometric analysis used in exemplary examples 7 to 16 is also referred to as the "direct breath test", which is used to demonstrate the ability of the present invention in detecting the presence of ammonia from vaporized samples. Furthermore, a difference between the signal intensities of ammonia-related signals detected prior to and after taking regular urea proved to be significant and comparable to the threshold value for accuracy of diagnosis adapted in the practice of the relatively expensive UBT.

Test conditions and results obtained for exemplary examples 7 to 16 are tabulated in Table 3 below, where "before" represents conducting the analysis prior to taking regular urea, and "after" represents conducting the analysis 30 minutes after taking regular urea.

TABLE 3

| Exemplary Example | Testee | Test Condition | Mass Spectrum |
|---|---|---|---|
| 7 | j (positive) | before | FIG. 4(a) |
| 8 | | after | FIG. 4(b) |
| 9 | k (negative) | before | FIG. 4(c) |
| 10 | | after | FIG. 4(d) |
| 11 | m (negative) | before | FIG. 4(e) |
| 12 | | after | FIG. 4(f) |
| 13 | n (negative) | before | FIG. 4(g) |
| 14 | | after | FIG. 4(h) |
| 15 | p (negative) | before | FIG. 4(i) |
| 16 | | after | FIG. 4(j) |

Figure 4:
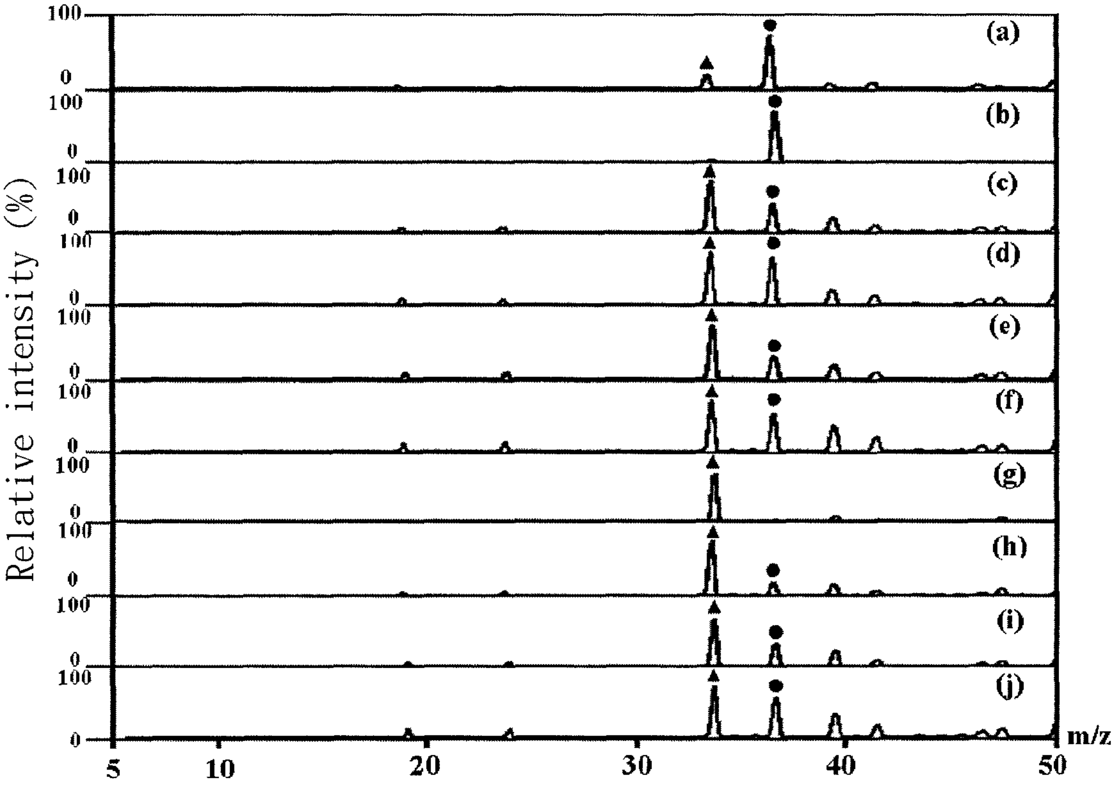
FIG. 4 is a diagram, illustrating mass spectra obtained as experiment results of exemplary examples 7 to 16.

Prior to taking regular urea, the intensities of ammonia-related signals detected in the breaths of the five testees differ from each other. In particular, as shown in FIG. 4(*a*), the intensity of the "●" signal (formed by $(NH_3.H_2O)H^+$) for testee "j" (previously categorized as helicobacter pylori infection positive in comparative example 1) before taking regular urea is significantly higher than those for the other four testees (previously categorized as helicobacter pylori infection negative in comparative examples 2 ~5) shown in FIGS. 4(*c*), 4(*e*), 4(*g*) and 4(*i*).

From the results, it is demonstrated that the mass spectrometric method according to the present invention is successful in detecting ammonia-related signal "●" directly from the breath of a testee, and is further successful in revealing differences of health conditions among a group of testees (by obtaining ammonia-related signal "●" with different intensities). Therefore, it has been proven that a mass spectrum obtained by using the mass spectrometric method of the present invention can indeed serve as a reference for the diagnosis of helicobacter pylori infection. It is believed that, after establishing a determination standard of helicobacter pylori infection with respect to the intensity of the ammonia-related signal "●" by obtaining enough quantity of objective statistic data, the mass spectrometric method of the present invention is capable of substituting for UBT.

In exemplary examples 17 to 26, the mass spectrometric method was conducted using the mass spectrometer 2 of the second preferred embodiment (shown in FIG. 2), where basification was also used.

With further reference to FIG. 2, mass spectrometric analysis was conducted on the breath of each of the five testees prior to and 30 minutes after the testee has taken regular urea. The liquid sample corresponding to each of the testees was prepared by making the testee exhale at the opening 163 through the sample supplying tube 162 into an acidic aqueous solution that has 2 mL pure water and 20 µL acetic acid and that is contained in the chamber 11 for one minute, and by adding $NaOH_{(aq)}$ into the acidic aqueous solution for basification of the acidic aqueous solution until the acidic aqueous solution has a pH value of 10. In the following discussion, the mass spectrometric analysis used in exemplary examples 17 to 26 is also referred to as the "indirect breath test".

Figure 5:
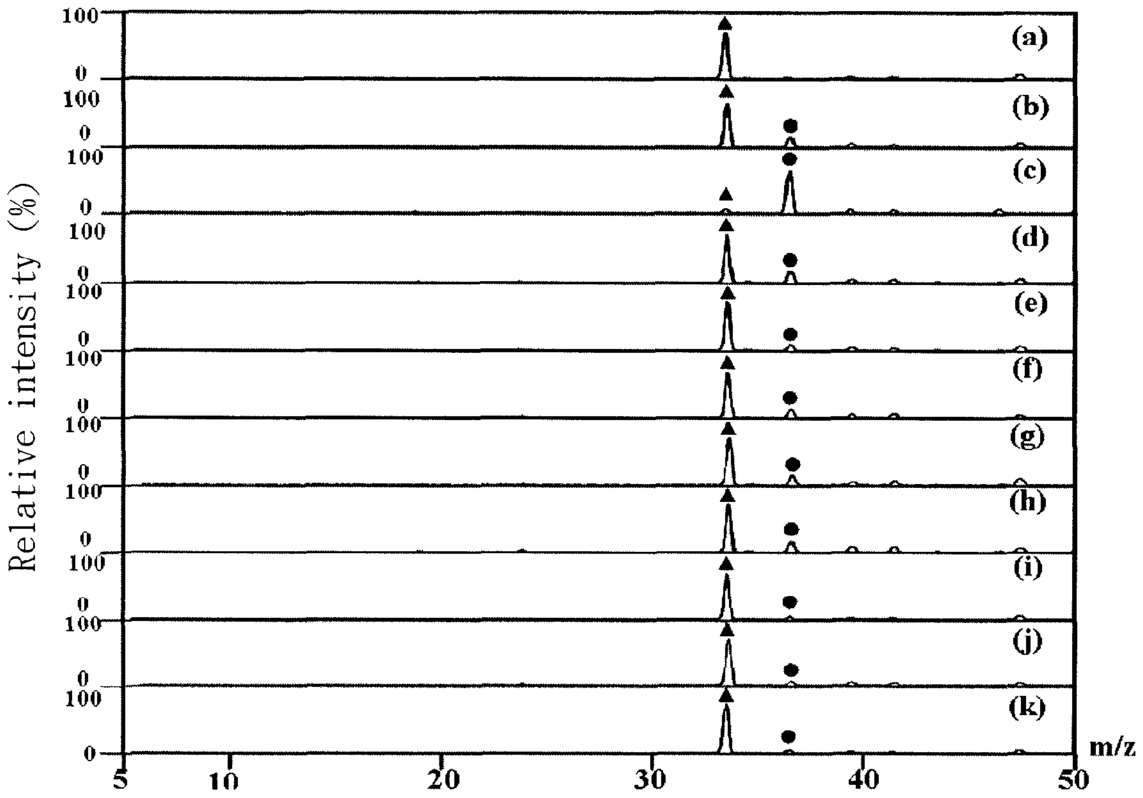
FIG. 5 is a diagram, illustrating mass spectra obtained as experiment results of comparative example 6 and exemplary examples 17 to 26.

In comparative example 6, an identical mass spectrometric analysis was conducted on the acidic aqueous solution prior to the addition of the testees' breaths. The mass spectrum obtained for comparative example 6 is shown in FIG. 5(*a*). Test conditions and results of exemplary examples 17 to 26 are tabulated in Table 4 below, where "before" represents conducting the analysis prior to taking regular urea, and "after" represents conducting the analysis 30 minutes after taking regular urea.

TABLE 4

| Exemplary Example | Testee | Test Condition | Mass Spectrum |
|---|---|---|---|
| 17 | j (positive) | before | FIG. 11(b) |
| 18 | | after | FIG. 11(c) |
| 19 | k (negative) | before | FIG. 11(d) |
| 20 | | after | FIG. 11(e) |
| 21 | m (negative) | before | FIG. 11(f) |
| 22 | | after | FIG. 11(g) |
| 23 | n (negative) | before | FIG. 11(h) |
| 24 | | after | FIG. 11(i) |
| 25 | p (negative) | before | FIG. 11(j) |
| 26 | | after | FIG. 11(k) |

From the results obtained before and after taking regular urea, the intensities of the ammonia-related signal "●" (formed by $(NH_3.H_2O)H^+$) for testee "j" (exemplary examples 17, 18) and testee "n" (exemplary examples 21, 22) reveal relatively more obvious variations. In addition, the intensity of the ammonia-related signal "●" after taking regular urea is greater than that before taking regular urea in both instances. Moreover, as shown in FIG. 5(*b*), the intensity of the "●" signal for testee "j" (previously categorized as helicobacter pylori infection positive in comparative example 1) before taking regular urea is significantly higher than those for the other four patients (previously categorized as helicobacter pylori infection negative in comparative examples 2~5) shown in FIGS. 5(*d*), 5(*f*), 5(*h*) and 5(*j*). This indicates that the results obtained from the "indirect breath test" matches with those obtained from the "direct breath test".

With reference to the results described hereinabove with respect to the exemplary examples and comparative examples, it can be shown that the present invention is capable of detecting vaporized ammonia directly from both a liquid sample and a vaporized (gaseous) sample. Further, the human breath and various body fluids, such as urine, that are more complicated in composition can also serve as samples for conducting the mass spectrometric analysis of the present invention. Evidently, the mass spectrometric method of the present invention can also be used to analyze environment sampling solutions or air.

Specifically, the mass spectrometric method of the present invention does not require the sample to have a large quantity. A volume of 200 μL is sufficient for liquid samples. In addition, detection limit with respect to concentration of ammonia is at least $10^{-8}$M. Therefore, ammonia can still be detected even when the sample under analysis is diluted. Consequently, the present invention is advantageous in having the characteristics of "requiring small quantities of samples" and "having an extremely low detection limit".

Furthermore, reading of the mass spectrum obtained from using the mass spectrometric method of the present invention is simple, fast and accurate, and can reveal differences among a group of samples. The present invention is even successful in detecting ammonia-related signals for a 100,000× diluted urine sample (shown in FIG. 3(*f*) for exemplary example 6).

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A mass spectrometric method for analyzing a vaporized sample, comprising the steps of:

forcing sequentially generated charge-laden liquid drops to move towards a receiving unit of a mass spectrometer along a traveling path;

establishing a concentration gradient for a target analyte so as to permit diffusion of the vaporized sample which contains at least one of the target analyte therein along a plurality of diffusing paths; and introducing the target-analyte containing vaporized sample through an inlet such that at least one of said diffusing paths intersects said traveling path so as to enable said at least one target analyte to be occluded in at least one of said charge-laden liquid drops to thereby form at least one corresponding ionized analyte for analysis by the mass spectrometer.

2. The mass spectrometric method according to claim 1, further comprising the step of providing an inert gas to force the target-analyte containing vaporized sample through the inlet.

3. The mass spectrometric method according to claim 2, further comprising the step of vaporizing the target-analyte containing sample from a liquid by at least one of gas purging and heating of the liquid prior to the introducing step.

4. The mass spectrometric method according to claim 3, wherein said target analyte is ammonia.

5. The mass spectrometric method according to claim 4, wherein said inert gas serves as the purging gas.

6. The mass spectrometric method according to claim 5, wherein said inert gas is nitrogen.

7. A mass spectrometer for analyzing a vaporized sample, comprising:

a chamber;

a receiving unit disposed in spatial communication with said chamber to admit therein ionized analytes that are derived from a vaporized sample, and including a mass analyzer for analyzing the ionized analytes;

an electrospray unit including a nozzle that is disposed in spatial communication with said chamber, that is configured to sequentially form liquid drops of an electrospray medium in said chamber, and that is spaced apart from said receiving unit in a longitudinal direction so as to define a traveling path;

a voltage supplying member disposed to establish between said nozzle and said receiving unit a potential difference which is of an intensity such that the liquid drops are forced to leave said nozzle as charge-laden ones for heading toward said receiving unit along the traveling path; and a sample supply unit having an inlet that is disposed in spatial communication with said chamber for introducing the vaporized sample such that, by virtue of concentration gradient for at least one target analyte contained in the vaporized sample, a plurality of diffusing paths are generated in said chamber;

wherein at least one of said plurality of diffusing paths intersects the traveling path so as to enable said at least one target analyte to be occluded in at least one of said charge-laden liquid drops to thereby form a corresponding one of the ionized analytes.

8. The mass spectrometer as claimed in claim 7, wherein said sample supply unit includes a gas supplying tube disposed upstream of said inlet for providing an inert gas to force the target-analyte containing vaporized sample through said inlet into said chamber.

9. The mass spectrometer as claimed in claim 7, wherein said sample supply unit includes a container for accommodating the target-analyte containing sample in liquid and vaporized states, a sample supplying tube disposed downstream of said container, and formed with said inlet, and a gas supplying tube disposed upstream of said container, and submerged in the liquid to permit an inert gas introduced therethrough to purge the liquid, thereby forcing the target-analyte containing vaporized sample through said inlet into said chamber.

10. The mass spectrometer as claimed in claim 9, wherein said sample supply unit further includes a heating member for heating the liquid.

* * * * *